(12) United States Patent
Nam et al.

(10) Patent No.: US 8,451,535 B2
(45) Date of Patent: May 28, 2013

(54) DISPLAY APPARATUS AND METHOD (75) Inventors: Dong Kyung Nam, Yongin-si (KR); Ju Yong Park, Seoul (KR); Kyu Young Hwang, Hwaseong-gi (KR); In Woo Ha, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/137,006

(22) Filed: Jul. 14, 2011

(65) Prior Publication Data
US 2012/0113097 A1 May 10, 2012

(30) Foreign Application Priority Data
Nov. 5, 2010 (KR) .................. 10-2010-0109874

(51) Int. Cl.
*H04N 13/04* (2006.01)
(52) U.S. Cl.
USPC ........................................ 359/458; 345/419
(58) Field of Classification Search
CPC ..................................................... H04N 13/04
USPC .............................. 345/419; 445/24; 359/458
See application file for complete search history.

(56) References Cited

U.S. PATENT DOCUMENTS

| | | | | |
|---|---|---|---|---|
| 4,130,338 A * | 12/1978 | Clay et al. | ............ | 359/28 |
| 5,497,170 A * | 3/1996 | Kato et al. | ............ | 345/9 |
| 5,606,455 A * | 2/1997 | Eichenlaub | ............ | 359/463 |
| 5,777,720 A * | 7/1998 | Shapiro et al. | ............ | 351/237 |
| 5,801,761 A * | 9/1998 | Tibor | ............ | 348/51 |
| 5,825,456 A * | 10/1998 | Tabata et al. | ............ | 351/201 |
| 5,833,507 A * | 11/1998 | Woodgate et al. | ............ | 445/24 |
| 5,930,037 A * | 7/1999 | Imai | ............ | 359/463 |
| 5,945,965 A * | 8/1999 | Inoguchi et al. | ............ | 345/6 |
| 5,969,850 A * | 10/1999 | Harrold et al. | ............ | 359/320 |
| 5,991,073 A * | 11/1999 | Woodgate et al. | ............ | 359/462 |
| 6,008,484 A * | 12/1999 | Woodgate et al. | ............ | 250/201.1 |
| 6,055,103 A * | 4/2000 | Woodgate et al. | ............ | 359/489.07 |
| 6,069,650 A * | 5/2000 | Battersby | ............ | 348/59 |
| 6,198,462 B1 * | 3/2001 | Daily et al. | ............ | 345/8 |
| 6,317,103 B1 * | 11/2001 | Furness et al. | ............ | 345/8 |
| 6,437,759 B1 * | 8/2002 | Turner et al. | ............ | 345/8 |
| 6,603,443 B1 * | 8/2003 | Hildebrand et al. | ............ | 345/8 |
| 6,752,498 B2 * | 6/2004 | Covannon et al. | ............ | 351/240 |
| 6,856,341 B2 * | 2/2005 | Suzuki | ............ | 348/51 |
| 7,505,061 B2 * | 3/2009 | Jones et al. | ............ | 348/51 |
| 7,719,484 B2 * | 5/2010 | Turner et al. | ............ | 345/8 |
| 7,839,548 B2 * | 11/2010 | Schwerdtner | ............ | 359/9 |
| 7,959,294 B2 * | 6/2011 | Balogh | ............ | 353/7 |
| 8,068,129 B2 * | 11/2011 | Schechterman et al. | ............ | 348/42 |
| 2002/0024592 A1 * | 2/2002 | Uomori et al. | ............ | 348/42 |

(Continued)

FOREIGN PATENT DOCUMENTS

| | | |
|---|---|---|
| JP | 2002-232917 | 8/2002 |
| JP | 2002232917 | * 8/2002 |

(Continued)

*Primary Examiner* — Clayton E Laballe
*Assistant Examiner* — Kevin Butler
(74) *Attorney, Agent, or Firm* — Staas & Halsey LLP (57) ABSTRACT

A display apparatus that may generate a high density light field image is provided. The display apparatus may identify an eye position of a user and set a virtual viewing window around the eye of the user. The display apparatus may generate a directional light corresponding to the viewing window and generate a high density light field image.

20 Claims, 10 Drawing Sheets

U.S. PATENT DOCUMENTS

| | | | |
|---|---|---|---|
| 2002/0186348 A1* | 12/2002 | Covannon et al. | 351/240 |
| 2004/0012671 A1* | 1/2004 | Jones et al. | 348/51 |
| 2005/0053274 A1* | 3/2005 | Mayer et al. | 382/154 |
| 2006/0007301 A1* | 1/2006 | Cho et al. | 348/51 |
| 2006/0139447 A1* | 6/2006 | Unkrich | 348/51 |
| 2006/0203339 A1* | 9/2006 | Kleinberger et al. | 359/465 |
| 2007/0019067 A1* | 1/2007 | Tsubaki et al. | 348/55 |
| 2007/0285509 A1* | 12/2007 | Lee | 348/43 |
| 2008/0068372 A1* | 3/2008 | Krah | 345/419 |
| 2008/0158343 A1* | 7/2008 | Schechterman et al. | 348/45 |
| 2008/0218856 A1* | 9/2008 | Saishu et al. | 359/464 |
| 2008/0252950 A1* | 10/2008 | Schwerdtner | 359/9 |
| 2008/0291269 A1* | 11/2008 | Hong et al. | 348/51 |
| 2010/0033784 A1* | 2/2010 | Renaud-Goud | 359/29 |
| 2010/0118045 A1* | 5/2010 | Brown Elliott et al. | 345/589 |
| 2010/0253677 A1* | 10/2010 | Kroll et al. | 345/419 |
| 2010/0259604 A1* | 10/2010 | Surman | 348/54 |
| 2011/0052009 A1* | 3/2011 | Berkovich et al. | 382/106 |
| 2011/0157172 A1* | 6/2011 | Bennett et al. | 345/419 |
| 2011/0181706 A1* | 7/2011 | Harrold et al. | 348/51 |
| 2011/0228049 A1* | 9/2011 | Kazakevich et al. | 348/45 |

FOREIGN PATENT DOCUMENTS

| | | |
|---|---|---|
| JP | 2006-271740 | 10/2006 |
| KR | 10-2007-0087631 | 8/2007 |
| KR | 10-2009-0116899 | * 11/2009 |
| KR | 1020090116899 | * 12/2009 |

* cited by examiner

MEASURE PUPIL
POSITION OF USER

FIG. 6B

SET VIEWING WINDOW

FIG. 6C

GENERATE DIRECTIONAL
BACKLIGHT

DISPLAY APPARATUS AND METHOD

CROSS-REFERENCE TO RELATED APPLICATIONS

This application claims the priority benefit of Korean Patent Application No. 10-2010-0109874, filed on Nov. 5, 2010, in the Korean Intellectual Property Office, the disclosure of which is incorporated herein by reference.

BACKGROUND

1. Field

One or more example embodiments of the present disclosure relate to a general display such as a TV, a monitor, a display of a portable device, an advertising display, an educational display field, and the like, and more particularly, to a high density light field display apparatus and method for reproducing and displaying a three-dimensional (3D) image without causing fatigue due to 3D viewing.

2. Description of the Related Art

A 3D image display apparatus may refer to an image display apparatus that may provide different images reflecting a viewpoint difference in the left eye and the right eye of a human to make a 3D effect.

A 3D image display apparatus may include a stereoscopic type display providing a left eye viewpoint image and a right eye viewpoint image, and a multi-view image providing an image from more various viewpoints.

Recently, the 3D image apparatus in the form of eyewear has become common considering marketability such as ease of technical configuration, a unit cost of production, and the like. To alleviate the inconvenience in wearing and keeping 3D eyewear, an interest in a non-eyewear type of the 3D display apparatus has increased.

When configuring a 3D display, viewing fatigue due to a convergence-accommodation conflict may occur. Research is being carried out to resolve the convergence-accommodation conflict using a light field image display technique, and the like.

The light field display corresponds to a concept including a widely known integral photography scheme, and the like, which may generate a light field on a space using a sufficient number of directional lights, and may configure a 3D image without a convergence-accommodation conflict occurring.

However, a full HD (high definition) image content is becoming common. Thus, to provide a high density light field to generate an HD image, resources available in a display apparatus may be insufficient to provide a high density light field to generate an HD image in 3D.

SUMMARY

The foregoing and/or other aspects are achieved by providing a display apparatus including a position sensor to sense an eye position of a user, a controller to set a virtual viewing window corresponding to the eye position of the user, and to provide a control signal generating a directional light toward the viewing window, and a light generator to generate the directional light based on the control signal.

The display apparatus may include a light modulator to modulate an intensity of the directional light based on the control signal.

The position sensor may include at least one camera that may photograph the eye position of the user.

The position sensor may include at least one camera that may identify the eye position of the user by photographing an identifier fixed around the eye position of the user.

The light generator may include a backlight to generate a non-directional light, a variable slit to convert, based on the control signal, the non-directional light to a plurality of point light sources, each having a different position, and a lens to generate a directional light toward the viewing window by refracting at least a part of the plurality of the point light sources.

Here, the variable slit may correspond to a plurality of pixels of a liquid crystal display (LCD) panel.

The controller may include an eye position detector to calculate a coordinate value of the eye position of the user on a space coordinate using the sensed eye position of the user, and a viewing window setting unit to determine at least one of a position of the viewing window and a size of the viewing window to cover the eye of the user using the coordinate value of the eye position of the user.

The controller may further include a directional light source controller to control a control signal to generate a directional light toward the viewing window, and a light field image generator to provide a control signal to generate a 3D image of a light field scheme by adjusting an intensity of the directional light toward the viewing window.

The foregoing and/or other aspects are achieved by providing a display method including sensing an eye position of a user, setting a virtual viewing window corresponding to the eye position of the user, and generating a directional light toward the viewing window.

The display method may further include displaying, on the viewing window, a light field image by controlling the directional light.

The generating of the directional light may include generating a non-directional light using a backlight, converting, using a variable slit, the non-directional light to a plurality of point light sources, each having a different position, and generating a directional light toward the viewing window by refracting at least a part of the plurality of point light sources using a refracting lens.

The setting of the virtual viewing window may include calculating a coordinate value of the eye position of the user on a space coordinate using the sensed eye position of the user, and determining, to cover the eye of the user using the coordinate value of the eye position of the user, at least one of a position of the viewing window and a size of the viewing window.

The foregoing and/or other aspects are achieved by providing a display apparatus. The display apparatus includes a position sensor to sense an eye position of a user using at least one of a visible light band camera, an infrared camera, and a depth camera, a controller to set a size of a virtual viewing window and to determine a position of the virtual viewing window based on the eye position of the user and a size of the eye, and to provide a control signal to generate a directional light toward the virtual viewing window, and a light generator including a backlight providing a standard light source, a variable slit to modulate the standard light source to a point light source at a predetermined position, and a lens to generate, based on the control signal, the directional light by refracting the point light source toward the virtual viewing window.

The foregoing and/or other aspects are achieved by providing a display method. The display method includes continuously tracing a pupil position of an eye of a viewer of a display, dynamically setting a virtual viewing window of the display to correspond to the continuously traced pupil position, and generating an image in the virtual viewing window while not generating an image in portions of the display that do not correspond to the virtual viewing window.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
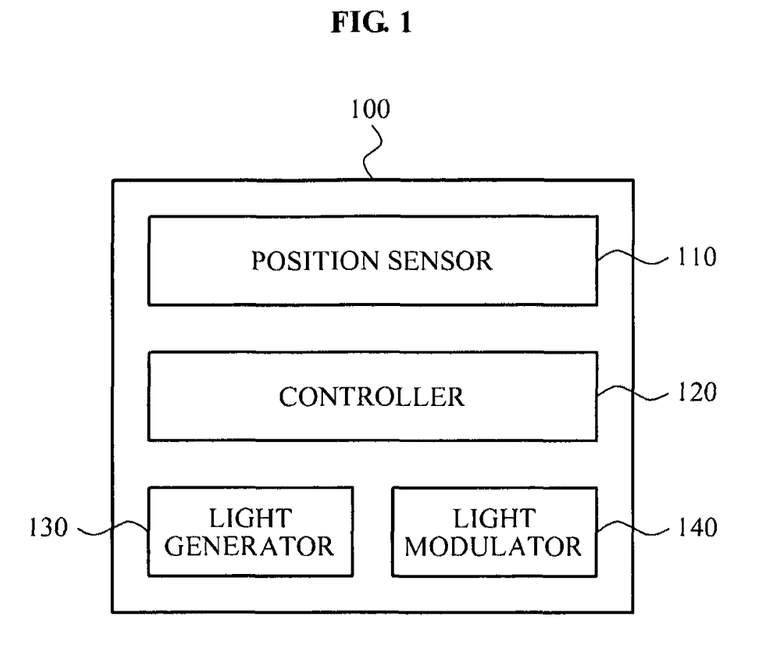
FIG. 1 illustrates a display apparatus according to example embodiments.

FIG. 1 illustrates a display apparatus 100 according to example embodiments.

Referring to FIG. 1, the display apparatus 100 may include, for example, a position sensor 110, a controller 120, a light generator 130, and a light modulator 140.

The position sensor 110 may refer to an apparatus for sensing, for example, an eye position of a user, which may be configured using at least one of a visible light band camera, an infrared camera, and a depth camera, or using a combination of the visible light band camera, the infrared camera, and the depth camera.

The display apparatus 100 may include an identifier that may correspond to a landmark, e.g., a feature point, an adhesive, and the like, (not shown) for easily detecting the eye position of the user, and the position sensor 110 may sense the eye position of the user by photographing the identifier.

The controller 120 may calculate the eye position of the user by receiving at least one of a parameter and a camera parameter that sensed the eye position, and may determine a position of a virtual viewing window and a size of a virtual viewing window to cover the calculated eye position of the user.

The controller 120 may generate a control signal to control the light generator 130 and the light modulator 140 to generate a light field image at a position of the virtual viewing window.

The light generator 130 may include, based on the control signal, a backlight that may provide a standard light source to generate a light field, a variable slit that may modulate the standard light source to a point light source at a predetermined position, a lens that may generate a directional light toward the viewing window by refracting the point light source, and the like.

The backlight of the light generator 130 may be configured as a Cold Cathode Fluorescent Lamp (CCFL), a light emitting diode (LED), an organic light emitting diode (OLED), a laser, and the like, and may also include an optical film, a prism, a filter, a mirror, and the like to improve straightness and directivity of a generated light.

The variable slit of the light generator 130 may generate, on a side of the refracting lens, a point light that may have a moving direction toward the viewing window by dividing a plane light generated by the backlight.

The variable slit may include an optical shutter, a prism, a filter, a mirror, and the like to control a direction and a brightness of a light source.

The generated point light may penetrate through a convex lens such as a Lenticular lens and the like to be refracted toward the viewing window, and may generate a light field image.

The light modulator 140 may adjust an intensity of a light field using the light source generated by the light generator 130.

When a point light is refracted through a lens toward a viewing window, an intensity of light may be required to be controlled to display a gradation of color. The controller 120 may provide the control signal, and the light modulator 140 may adjust an actual intensity of light.

The light modulator 140 may be configured as a pixel of a liquid crystal display (LCD) element.

A generating process of a high density light field image of the display apparatus 100 will be described more fully hereinafter with reference to FIG. 2 and the remaining drawings.

Figure 2:
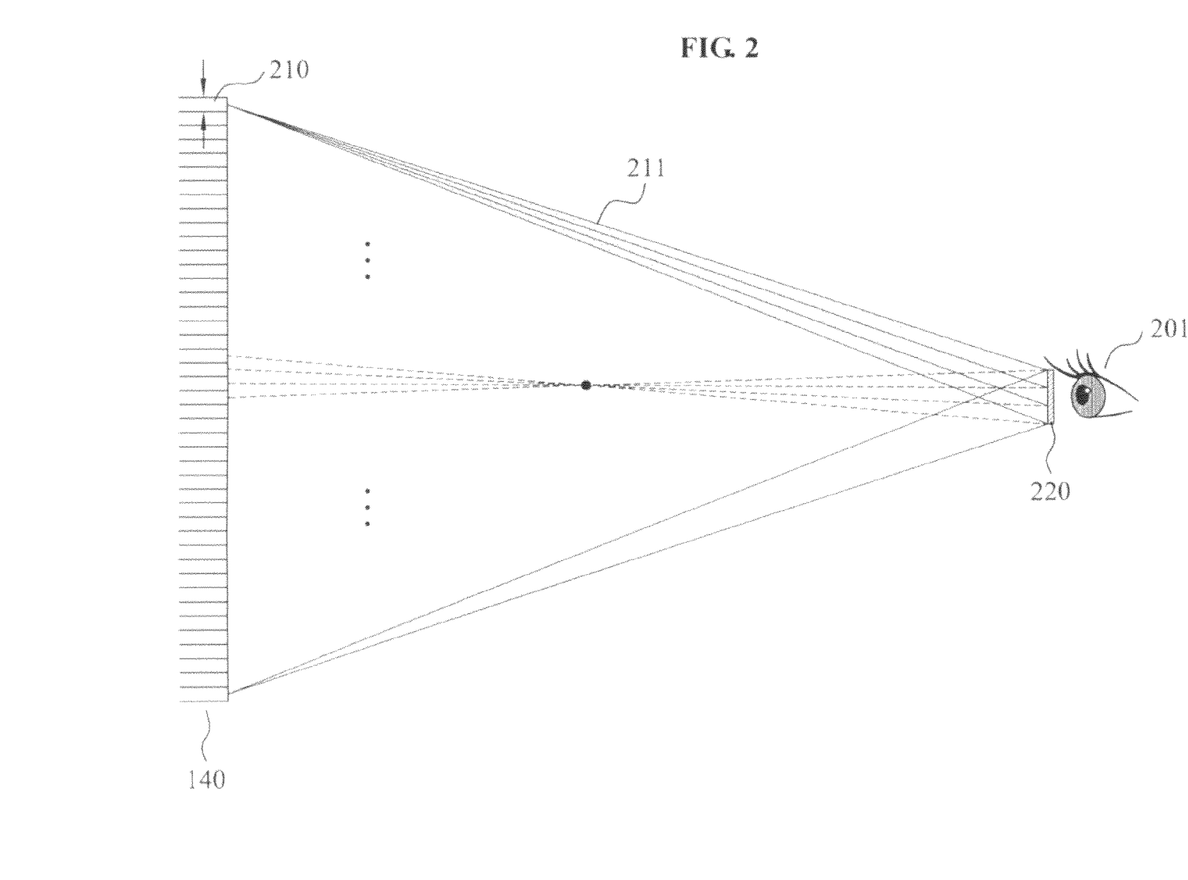
FIG. 2 illustrates a diagram to describe a progression of a directional light for generating a viewing window and a high density light field image which are set by a controller of the display apparatus of FIG. 1.

FIG. 2 illustrates a diagram to describe a progression of a directional light for generating a viewing window and a high density light field image which are set by a controller of the display apparatus 100 of FIG. 1.

The controller 120 of the display apparatus 100 may calculate an eye position of a user using an eye position sensing measurement of the position sensor 110, a camera parameter, and/or the like, and may set a small viewing window 220 to cover the calculated eye position, and more particularly, a pupil.

For example, a diameter of a human pupil may range from about 2 mm to about 8 mm depending on surrounding brightness and thus, the controller 120 may set the size of the viewing window 220 to about 8 mm×8 mm, which may generate a light field image by concentrating light.

At least two lights may be displayed within a pupil with respect to width and length by displaying four lights 211 in each of width and length on the inside of the viewing window.

Here, each of 3D element points 210 included in the light modulator 140 of the display apparatus 100 may generate sixteen lights. When a number of the 3D element points is VGA 300,000, a high density light field display may be configured using about 4,800,000 lights in total.

4,800,000 pixels may correspond to about 2.3 times greater than the number of pixels of a current full HD display, which may be configured in a currently commercialized high resolution monitor.

In contrast, in order to generate a high density light field image in the entire viewing space without setting a viewing window corresponding to the eye position of the user, a much larger number of pixels may be required than the 4,800,000 pixels described above.

For example, when each of the 3D element points 210 generates a light projecting at about 30° to 15° every 0.1° that corresponds to an angle where at least two lights may enter a pupil of an observer 1 m away from the high density light field display, the number of lights to be generated in each of the 3D element points 210 may correspond to 45,000 (=300×150), and the total number of required lights may correspond to more than 13.5 billion by multiplying a position resolution of 300,000 by a direction resolution of 45,000.

Accordingly, the number of pixels used for the display apparatus 100 may be significantly reduced by detecting a position of an eye 201 of the user, tracing the eye position of the user continuously, dynamically setting the viewing window 220, and generating a high density light field image only in the viewing window 220.

Figure 3:
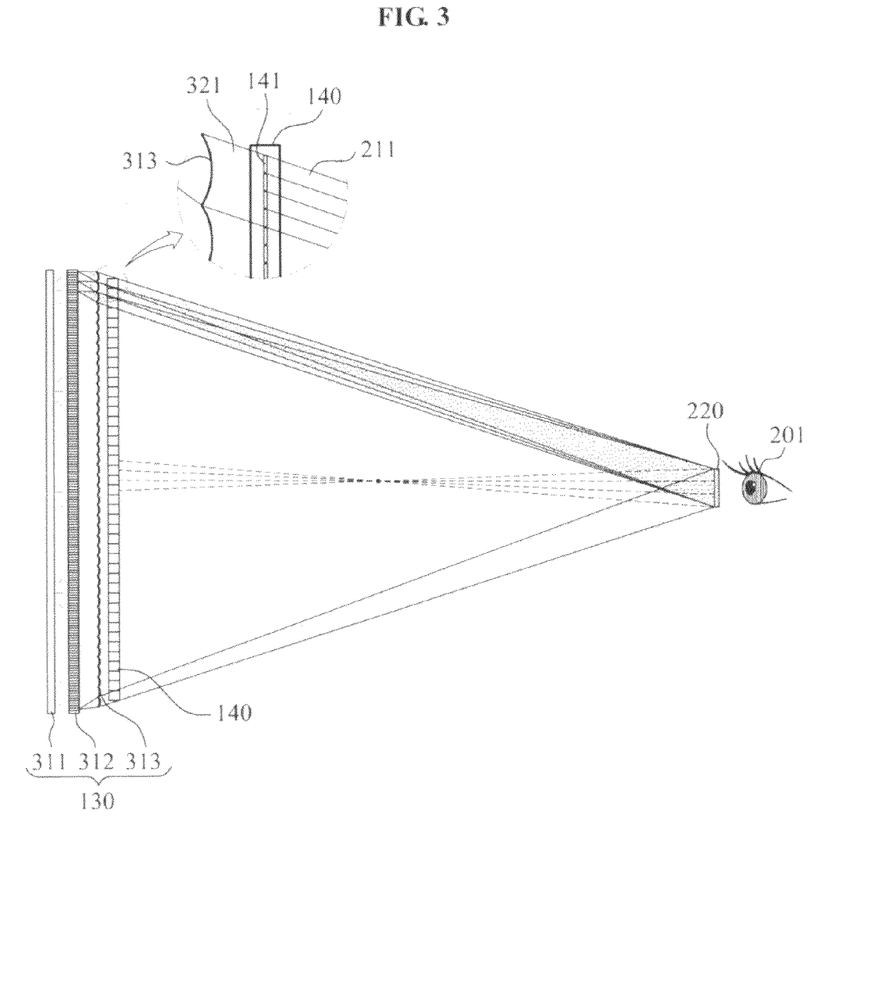
FIG. 3 illustrates a diagram of generating a high density light field image in a viewing window by a light generator and a light modulator of the display apparatus of FIG. 1.

FIG. 3 illustrates a diagram of generating a high density light field image in the viewing window 220 by the light generator 130 and the light modulator 140 of the display apparatus of FIG. 1 according to example embodiments.

As described above, the light generator 130 may include a backlight 311 to generate a plane light, a variable slit 312 to generate a point light in a predetermined position by dividing the plane light based on a control signal, and a lens 313 to generate a directional light toward the viewing window 220.

The light modulator 140 may display a gradation of color and generate a light field by at least one of readjusting a direction of the directional light based on a control signal, and adjusting an intensity of the directional light.

The light modulator 140 may control a detailed direction of a directional light 321 or adjust an intensity of the directional light 321 that penetrates through the lens, and may generate a light field corresponding to the four lights 211 using an LCD pixel 141.

The generated light field may be concentrated and displayed on the viewing window 220 around the eye of the user to display an image with a high density to the user.

Figure 4:
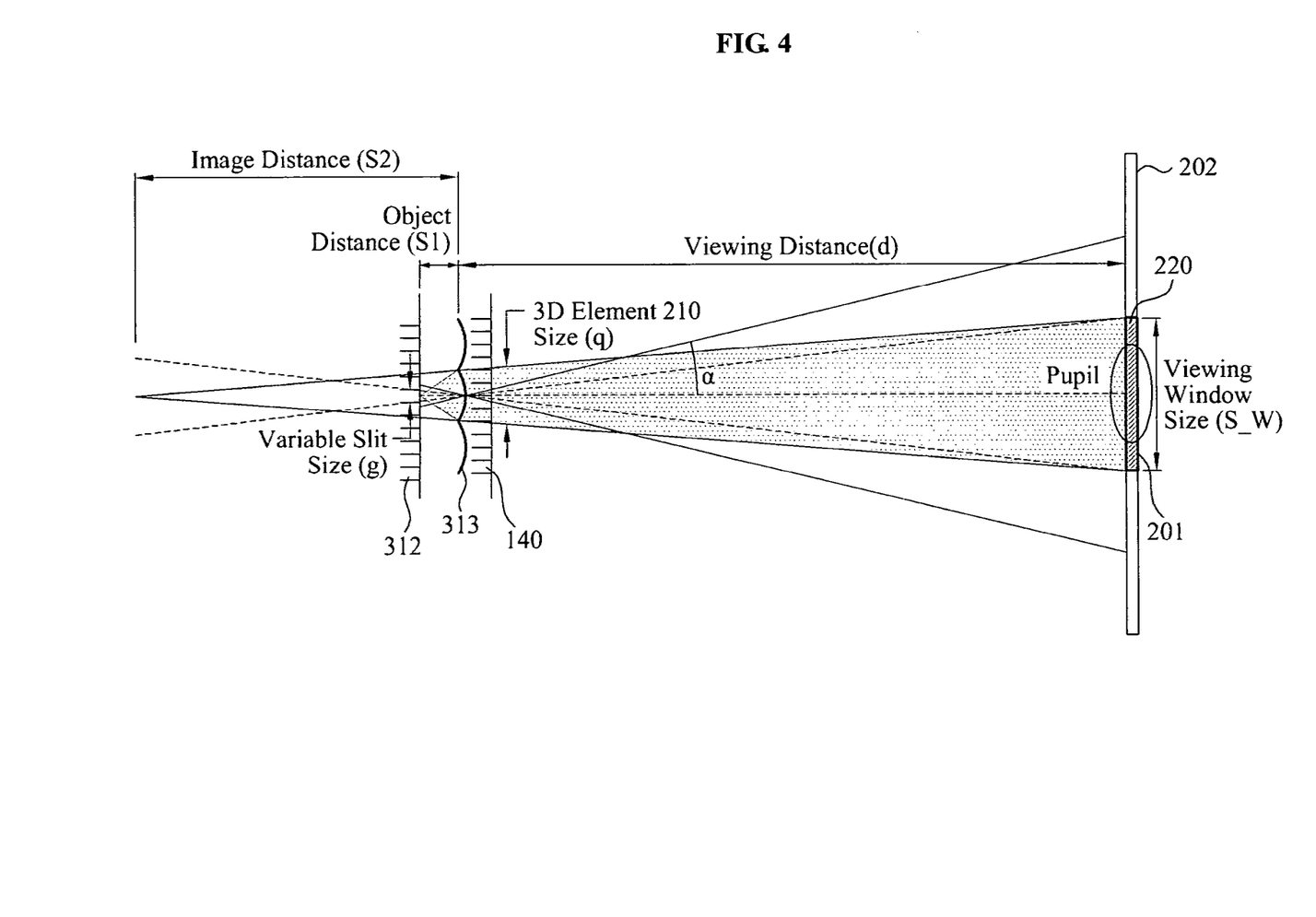
FIG. 4 illustrates a diagram to describe an example of a parameter calculation process to design a light generator of the display apparatus of FIG. 1.

FIG. 4 illustrates a diagram to describe an example of a parameter calculation process to design the light generator 130 of the display apparatus 100 of FIG. 1.

In a design for the lens 313 to configure a source of the directional light 321, as an example, a pitch g of the variable slit 312 corresponding to 0.15 mm, a size q of the 3D element points 210 corresponding to 0.6 mm, a size S_W of the viewing window corresponding to 8 mm×8 mm, and a viewing distance d corresponding to a distance between the lens 313, and the viewing window 220 corresponding to 1000 mm, may be assumed.

Here, an object distance S1 is expressed as [Equation 1]:

$$S1:g=d:S\_W \qquad\qquad$$

Substituting the above values into Equation 1, S1 is calculated to be:

$$S1=g*d/S\_W=18.75 \text{ mm} \qquad\text{[Equation 2]}$$

An image distance S2 is calculated by:

$$S2:q=S2+d:S\_W \qquad\text{[Equation 3]}$$

Substituting the above values into Equation 3, S2 is calculated to be:

$$S2=(d*q)/(S\_W-q)=81.08 \text{ mm} \qquad\text{[Equation 4]}$$

Accordingly, a focal distance f_L of the lens is calculated to be:

$$1/S1-1/S2=1/F\_L; \text{ and} \qquad\text{[Equation 5]}$$

$$F\_L=(S1*S2)/(S2-S1)=24.39 \text{ mm} \qquad\text{[Equation 6]}$$

According to the calculation results, by arranging, in front of the variable slit 312, the micro lens 313 with a thickness of about 18.75 mm and a focal distance of about 24.39 mm, a directional light source may be generated to constitute the virtual viewing window 220 of about 8 mm×8 mm around the eye 201 of the user.

The above described calculation should not be construed as being limited to the example embodiments as various modifications and variations can be made without departing from the spirit of the disclosure or the scope of which is defined by the claims and their equivalents.

Figure 5:
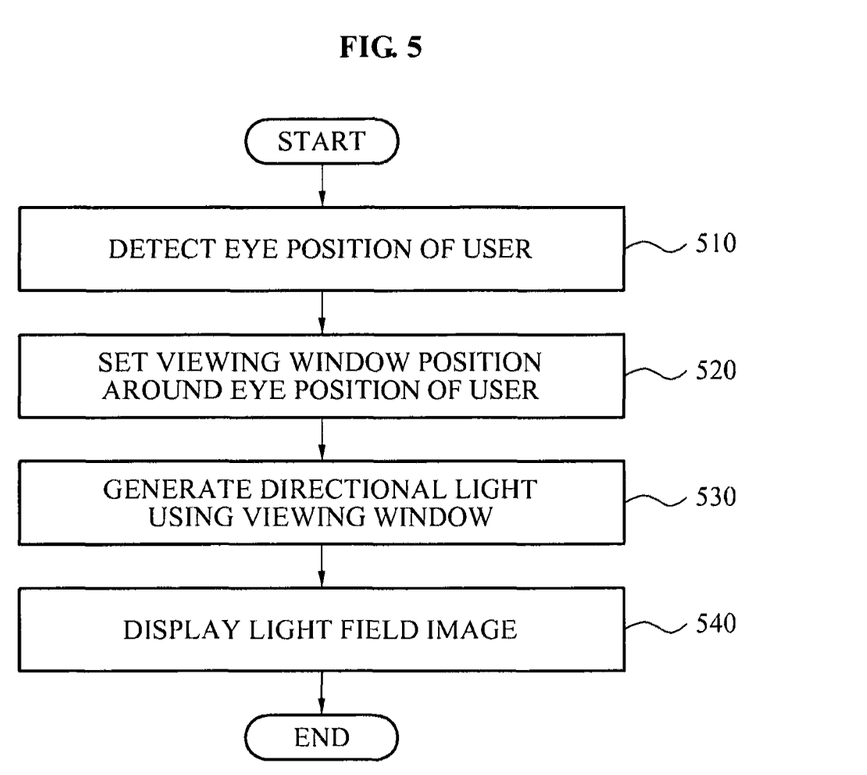
FIG. 5 illustrates a flowchart of a display method according to example embodiments.

FIG. 5 illustrates a flowchart of a display method according to example embodiments.

In operation 510, an eye position of a user may be sensed, for example, by a position display apparatus, and the eye position of the user may be detected using the sensing result, for example, by the controller 120.

In operation 520, a position of a virtual viewing window and a size of the virtual viewing window may be determined to concentrate a light field around the eye position, for example, by the controller 120.

In operation 530, a directional light source may be generated and directed toward the viewing window 220, for example, by the light generator 130 and the light modulator 140 and based on a signal from the controller 120. A high density light field image may be displayed in operation 540, for example, using the generated directional light source.

FIG. 6A through 6D illustrate diagrams of a generating process of a high density light field image using the display method of FIG. 5.

Figure 6A:
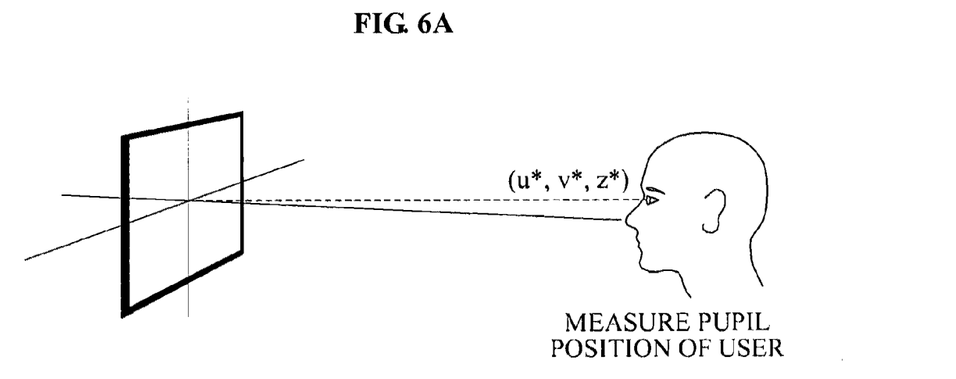
FIGS. 6A through 6D illustrate diagrams of a generating process of a high density light field image using the display method of FIG. 5.
Figure 6B:
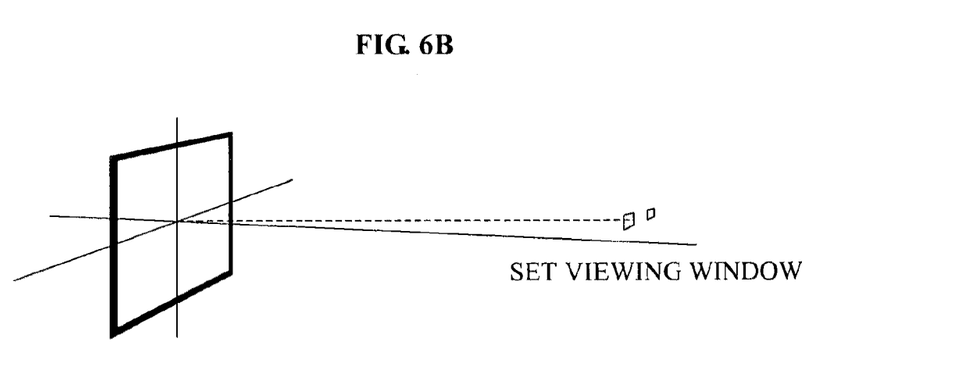

FIG. 6A illustrates measuring of an eye position of the user, and more particularly, a pupil position, for example, u*, v*, and z* corresponding to operation 510 of FIG. 5, and FIG. 6B illustrates setting the viewing window 220 corresponding to operation 520 of FIG. 5.

Figure 6C:
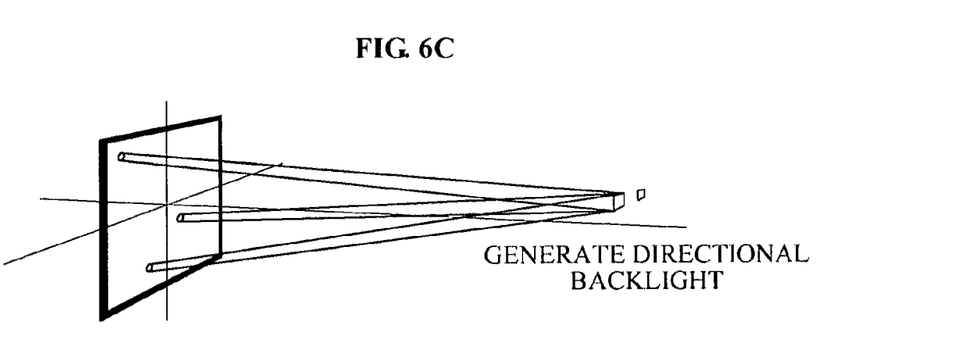
Figure 6D:
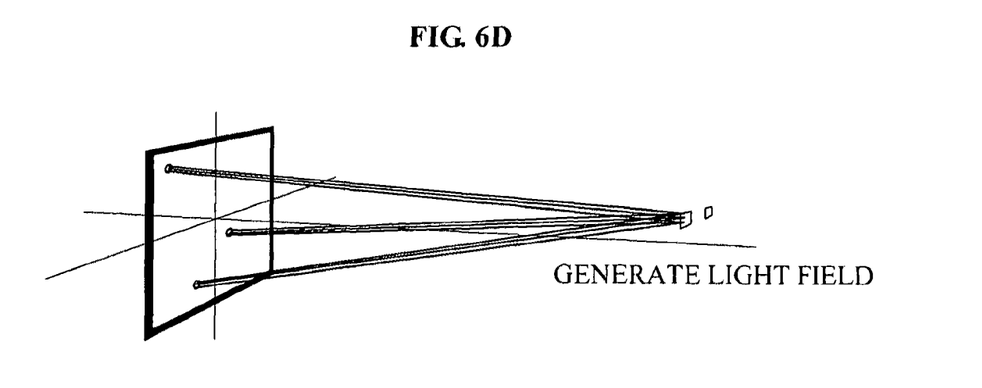

FIG. 6C illustrates generating a directional light corresponding to operation 530 of FIG. 5, and FIG. 6D illustrates generating a light field image corresponding to operation 540 of FIG. 5.

Figure 7:
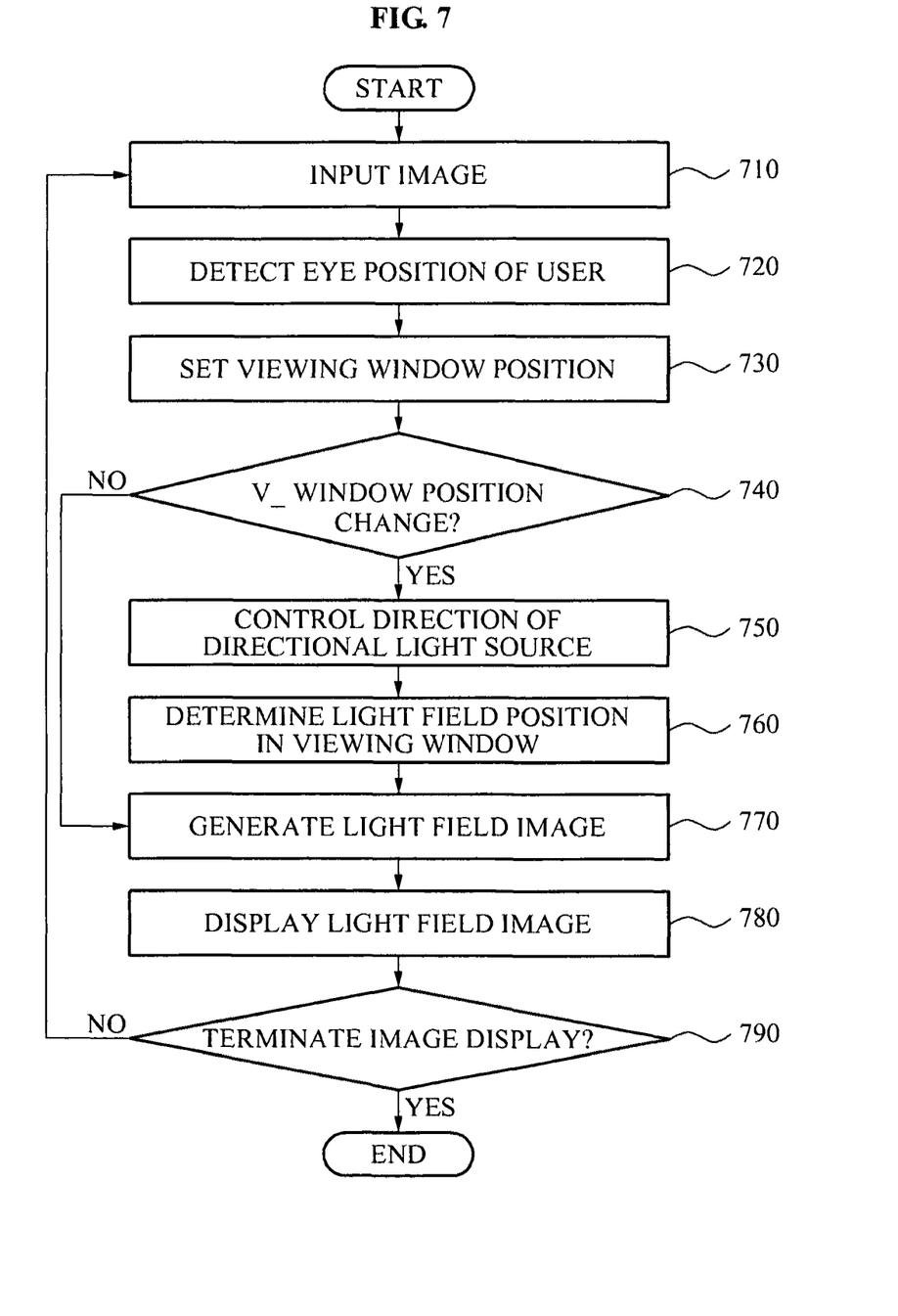
FIG. 7 illustrates a flowchart of the display method of FIG. 5.

FIG. 7 illustrates a flowchart of the display method of FIG. 5, more particularly, FIG. 7 illustrates a flowchart of the display method of FIG. 5 from recursively inputting an image to a proceeding process of an entire display procedure.

In operation 710, an image may be input. The image may correspond to a frame image signal corresponding to each viewpoint of a multi-view image.

A process of detecting eye position of a user in operation 720 corresponds to operation 510 of FIG. 5, and a process of setting a viewing window in operation 730 corresponds to operation 520 of FIG. 5.

In operation 740, whether there is a change in the eye position of the user may be determined, that is, a change in a position of the viewing window, compared with an image display viewpoint of a prior frame.

In operation 770, when the position of the view window is unchanged, a light field image may be immediately generated based on the input image signal without additionally controlling the directional light source direction.

Conversely, when there is a change in the position of the view window, the controller 120 of the display apparatus 100 may dynamically reflect the change, and may provide a control signal with the light generator 130 and the light modulator 140 to control the direction of the directional light in operation 750.

In operation 760, the light generator 130 and the light modulator 140 may control the directional light by determining a light field position in the viewing window, and a light field image may be generated in operation 770.

The user may view a light field image displayed in operation 780, and the above described procedure may recursively repeat until terminating an image display in operation 790.

Figure 8:
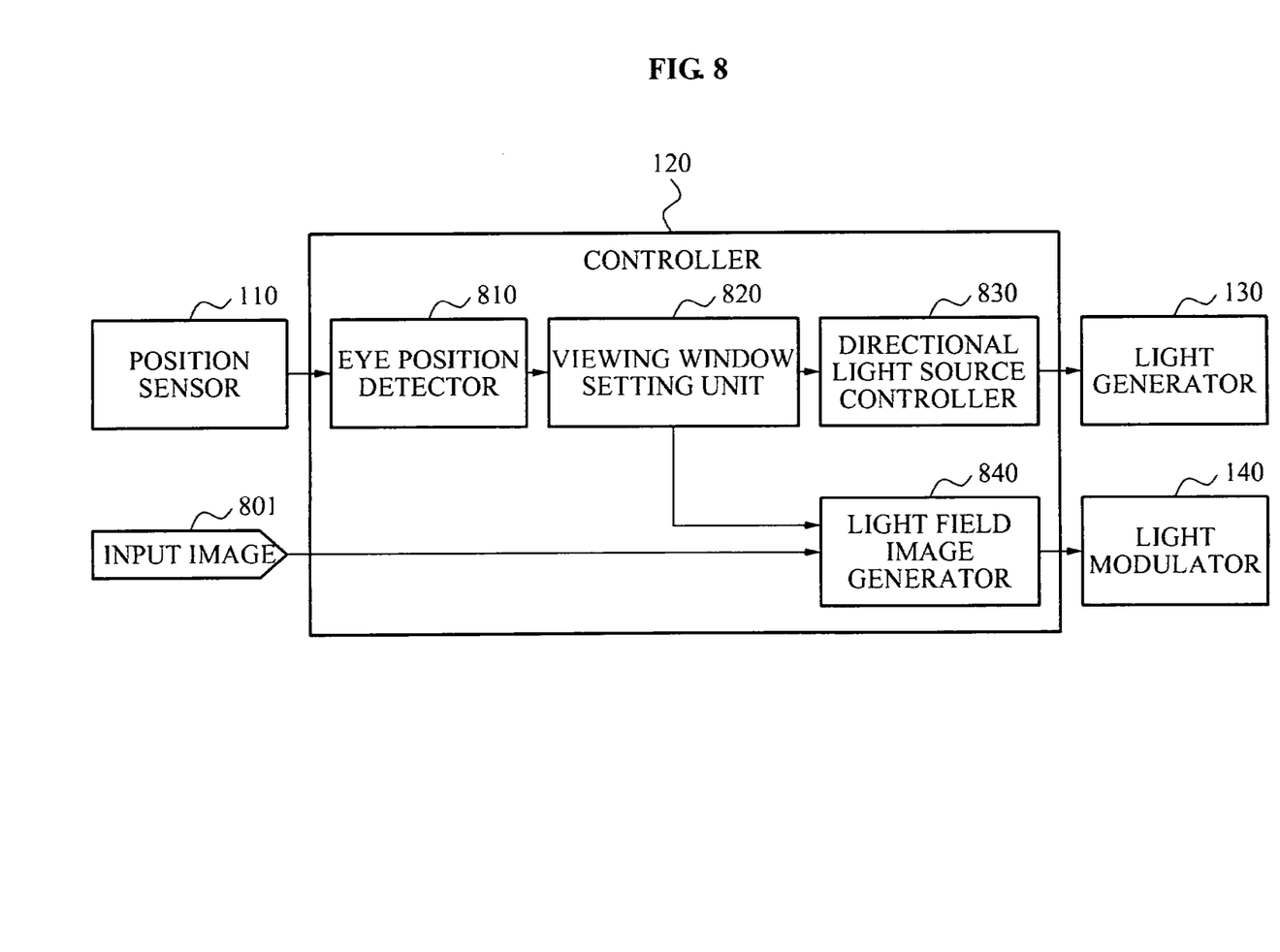
FIG. 8 illustrates a configuration of a controller of the display apparatus of FIG. 1.

FIG. 8 illustrates a configuration of the controller 120 of the display apparatus of FIG. 1.

The controller 120 may include an eye position detector 810 to calculate an eye position of a user, for example, a pupil position using a photographing result of the eye position of the user and/or using a camera parameter of the position sensor 110, and a viewing window setting unit 820 to determine a position of the viewing window and a size of the viewing window to cover the pupil of the user using the calculating result.

A directional light source controller 830 may provide a control signal to the light generator 130 to generate a directional light based on the position of the viewing window and the size of the viewing window set by the viewing window setting unit 820.

A light field image generator 840 may consider the position of the viewing window and the size of the viewing window, and may provide a control signal to adjust a detailed direction of the directional light or an intensity of the directional light in the light modulator 140 based on an input image 801.

Figure 9:
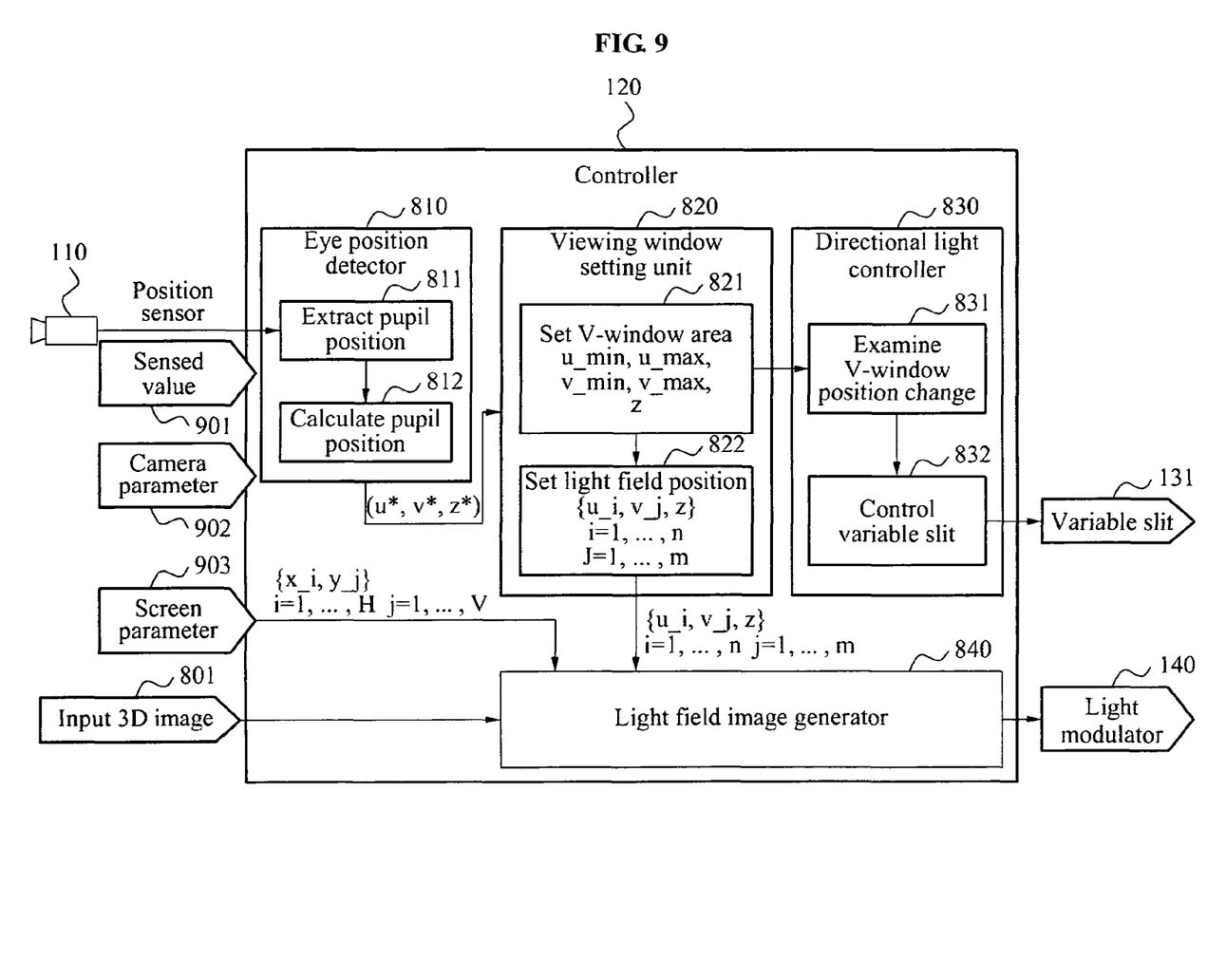
FIG. 9 illustrates a diagram of a generating process of a high density light field image in the detailed configuration of the controller of FIG. 1.

FIG. 9 illustrates a diagram of a generating process of a high density light field image in the detailed configuration of the controller 120 of FIG. 1.

The position sensor may provide a sensed value 901 with the eye position detector 810, and the eye position detector 810 may calculate a pupil position.

Here, the eye position detector 810 may calculate the pupil position, for example, $u^*$, $v^*$, and $z^*$ by receiving a camera parameter 901 or using a pre-stored camera parameter.

Then, the viewing window setting unit 820 may set a viewing window. Here, the viewing window setting unit 820 may set a minimum u_min and a maximum u_max of a horizontal direction coordinate u and set a minimum v_min and a maximum v_max of a vertical direction coordinate v, and may specify a viewing window by setting a distance direction coordinate z of the viewing window in operation 821.

The viewing window setting unit 820 may set a position of a light field, which corresponds to a process of specifying n horizontal direction position(s) and m vertical direction position(s).

The specified light field position may be transmitted to the light field image generator 840, and the input 3D image 801 and a screen parameter 903 specifying a viewing environment are reflected to generate a light field image in the light modulator 140.

When the viewing window area is set, the result may be transmitted to the directional light source controller 830, and whether a change occurs in the viewing window position in operation 831 corresponding to operation 740 of FIG. 7 may be determined, and the result may also be transmitted to a variable slit controller 832, and a control signal may be transmitted to the variable slit 131.

For ease of description, the above processes of setting a viewing window and generating a light field have been described with respect to a single viewpoint, for example, a left viewpoint or a right viewpoint. However, the above description may be simultaneously applicable for generating a light field of a left viewpoint image and a right viewpoint light field without any particular difficulty. Here, it may be obviously configured, using the above described process, to set each viewing window with respect to the left eye and the right eye and to generate each of the light fields using each directional light source.

A process of generating a light field image by setting a viewing window for the left eye and generating a light field image by setting a viewing window for the right eye may be feasible by configuring a viewing window by spatially allocating a pixel resource, or by temporally dividing the pixel resource.

The description may be understood without additional disclosure describing that a current 3D display alternately provides a left image and a right image.

For example, a projector to configure a light field image may be used, and a light field may be generated by arranging a lens on a display surface.

The method according to the above-described embodiments may be recorded in non-transitory computer-readable media including program instructions to implement various operations embodied by a computer. The media may also include, alone or in combination with the program instructions, data files, data configurations, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like.

Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa. Any one or more of the software modules or units described herein may be executed by a dedicated processor unique to that unit or by a processor common to one or more of the modules. The described methods may be executed on a general purpose computer or processor or may be executed on a particular machine such as the display apparatuses described herein.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A display apparatus, comprising:
   a position sensor to sense an eye position of a user;
   a controller to set a virtual viewing window corresponding to the sensed eye position of the user and to provide a control signal to control generating of a directional light toward the virtual viewing window; and
   a light generator to generate the directional light toward the virtual window based on the control signal.

2. The display apparatus of claim 1, further comprising:
   a light modulator to modulate an intensity of the directional light based on the control signal.

3. The display apparatus of claim 1, wherein the position sensor comprises at least one camera to photograph the eye position of the user.

4. The display apparatus of claim 1, wherein the position sensor comprises at least one camera to identify the eye position of the user by photographing an identifier fixed around the eye position of the user.

5. The display apparatus of claim 1, wherein the light generator comprises:
   a backlight to generate a non-directional light;
   a variable slit to convert, based on the control signal, the non-directional light to a plurality of point light sources, each having a different position; and
   a lens to generate the directional light toward the virtual viewing window by refracting at least a part of the plurality of point light sources.

6. The display apparatus of claim 5, wherein the variable slit corresponds to a plurality of pixels of a liquid crystal display (LCD) panel.

7. The display apparatus of claim 1, wherein the controller comprises:
   an eye position detector to calculate a coordinate value of the eye position of the user on a space coordinate using the sensed eye position of the user; and
   a viewing window setting unit to determine at least one of a position of the virtual viewing window and a size of the virtual viewing window to cover the eye of the user using the coordinate value of the eye position of the user.

8. The display apparatus of claim 7, wherein the controller further comprises:
   a directional light source controller to control a control signal to generate a directional light toward the virtual viewing window; and
   a light field image generator to provide a control signal to generate a three-dimensional (3D) image of a light field scheme by adjusting an intensity of the directional light toward the virtual viewing window.

9. A display method, comprising:
   sensing an eye position of a user;
   setting a virtual viewing window corresponding to the sensed eye position of the user; and
   generating a directional light toward the virtual viewing window.

10. The display method of claim 9, further comprising:
    displaying, on the virtual viewing window, a light field 3D image by controlling generated the directional light.

11. The display method of claim 9, wherein the generating of the directional light comprises:
    generating a non-directional light using a backlight;
    converting, using a variable slit, the non-directional light to a plurality of point light sources, each having a different position; and
    generating a directional light toward the virtual viewing window by refracting at least a part of the plurality of point light sources using a refracting lens.

12. The display method of claim 9, wherein the setting of the virtual viewing window comprises:
    calculating a coordinate value of the eye position of the user on a space coordinate using the sensed eye position of the user; and
    determining, to cover the eye of the user using the coordinate value of the eye position of the user, at least one of a position of the virtual viewing window and a size of the virtual viewing window.

13. The display method of claim 12, wherein the position of the virtual viewing window and the size of the virtual viewing window are determined based on a position of a pupil of the eye of the user and a size of the pupil, respectively.

14. The display method of claim 9, wherein the sensing of the eye position of the user comprises:
    photographing a front image using at least one camera; and
    sensing the eye position of the user by identifying the eye of the user from the front image.

15. The display method of claim 9, wherein the sensing of the eye position of the user comprises:
    photographing an identifier fixed around the eye position of the user using at least one camera.

16. A non-transitory computer-readable medium comprising a program for instructing a computer to perform the display method of claim 9.

17. A display apparatus, comprising:
    a position sensor to sense an eye position of a user using at least one of a visible light band camera, an infrared camera, and a depth camera;
    a controller to set a size of a virtual viewing window and to determine a position of the virtual viewing window based on the eye position of the user and a size of the eye, and to provide a control signal to control generating of a directional light toward the virtual viewing window; and
    a light generator including a backlight providing a standard light source, a variable slit to modulate the standard light source to a point light source at a predetermined position, and a lens to generate, based on the control signal, the directional light by refracting the point light source toward the virtual viewing window.

18. The display apparatus of claim 17, further comprising a light modulator to adjust at least one of an actual intensity of the point light and a direction of the directional light based on a control signal from the controller.

19. The display apparatus of claim 17, wherein the controller sets the size of the virtual viewing window based on a size of a pupil of the eye of the user and determines the position of the virtual viewing window based on a position of the pupil.

20. A display method comprising:
    continuously tracing a pupil position of an eye of a viewer of a display;
    dynamically setting a virtual viewing window of the display to correspond to the continuously traced pupil position; and
    generating an image in the virtual viewing window while not generating an image in portions of the display that do not correspond to the virtual viewing window.

* * * * *

UNITED STATES PATENT AND TRADEMARK OFFICE
CERTIFICATE OF CORRECTION

PATENT NO. : 8,451,535 B2
APPLICATION NO. : 13/137006
DATED : May 28, 2013
INVENTOR(S) : Dong Kyung Nam et al.

It is certified that error appears in the above-identified patent and that said Letters Patent is hereby corrected as shown below:

Title Page Col. 1 (Inventors), Line 3, Delete "Hwaseong-gi" and insert -- Hwaseong-si --, therefor.

Signed and Sealed this
Eighth Day of October, 2013

Teresa Stanek Rea
*Deputy Director of the United States Patent and Trademark Office*